Patented Oct. 20, 1931

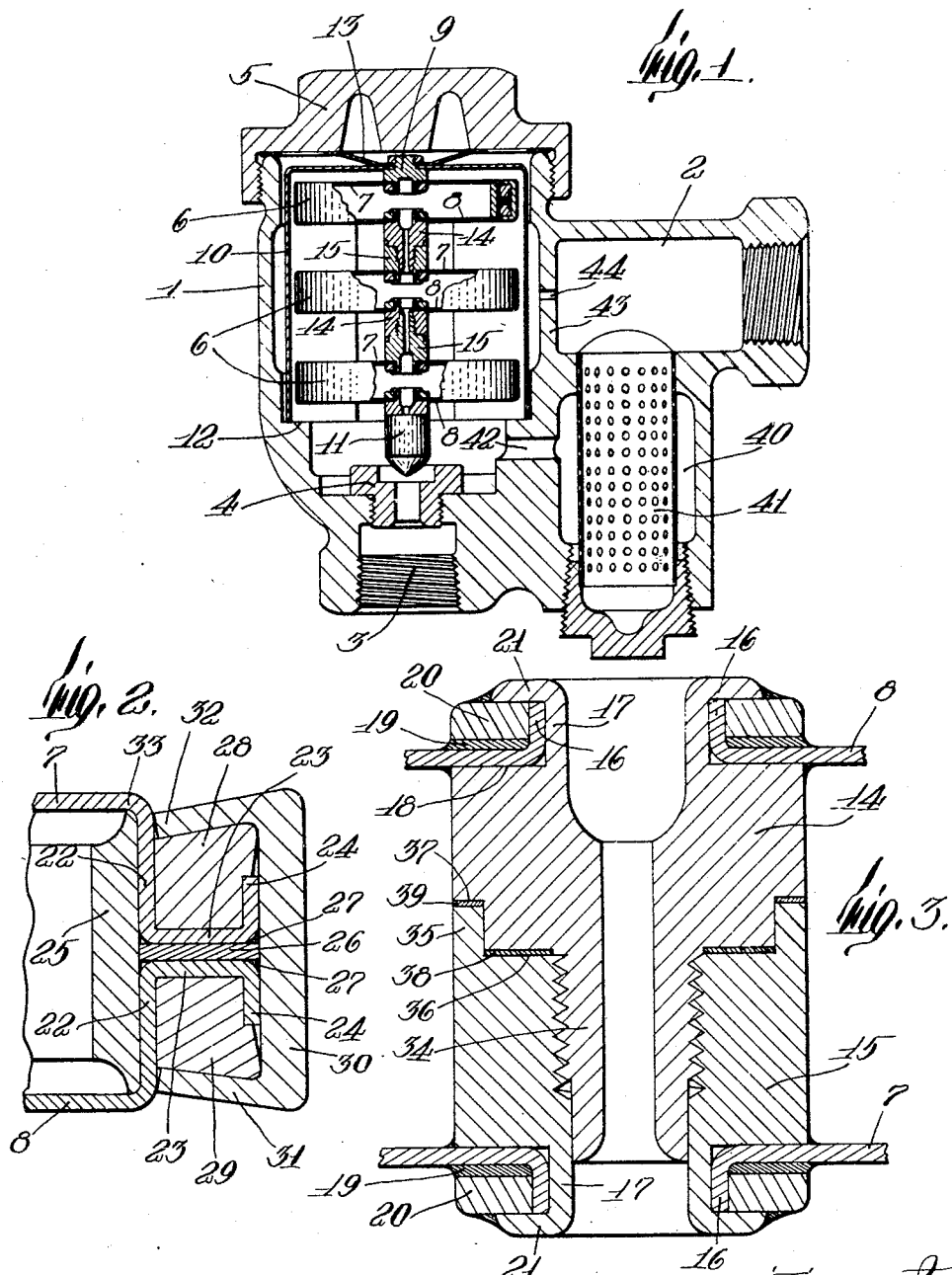

1,828,080

UNITED STATES PATENT OFFICE

WILLIAM K. SIMPSON, OF WATERBURY, CONNECTICUT, ASSIGNOR TO HOFFMAN SPECIALTY COMPANY, OF WATERBURY, CONNECTICUT, A CORPORATION OF ILLINOIS

THERMOSTATIC STEAM TRAP

Application filed September 25, 1928. Serial No. 308,270.

The present invention relates to steam traps of the type in which the discharge valve is operated by an expansible and contractible thermostat containing a volatile fluid. More particularly it relates to thermostats for such traps consisting of two or more drums or boxes, having flexible end walls, and connecting nipples between the nearer end walls of adjacent drums. Its object is to improve and perfect the construction of such thermostats to the end that they may withstand the effects of high pressure steam.

Thermostats of the type above specified are fabricated or built up of separate pieces of material; the end walls of the drums being plates of sheet metal, constituting diaphragms, in order to have the desired area, flexibility and uniformity of movement under pressure; and the end-wall plates of each individual drum being connected together peripherally by suitable connecting means, while contiguous plates of adjacent drums are connected together by intermediate tubular nipples. Prior to this invention no fabricated thermostat of the character indicated has been produced capable of functioning reliably under a steam pressure as high at 100 pounds by the gauge, or indeed any pressure at all nearly approaching that figure. This is because the high temperature of high pressure steam melts or so softens the solder heretofore relied on for sealing the joints between the connected parts that the thermostats become leaky and wholly unreliable in any service where they are subjected to steam at a pressure of more than a few pounds.

In accordance with this invention I have devised novel means for connecting and sealing diaphragm disks at their outer rims to form closed drums or boxes and for securing and sealing intermediate connecting nipples to such diaphragms and to one another, by which leakage tightness of the joints and satisfactory operation of the thermostat as a whole are secured when exposed to steam at pressures and temperatures greatly in excess of those which thermostats of this type heretofore used are able to withstand. The invention consists in the novel constructions by which these results are brought about, and in the mode of making them, as hereinafter fully explained.

In the drawings furnished herewith,—

Fig. 1 is a sectional view of the steam trap containing a thermostat embodying this invention;

Fig. 2 is a sectional view enlarged of the circumferential joint between two of the disks or diaphragms constituting one of the pressure drums of the thermostat;

Fig. 3 is an enlarged sectional view of the connecting nipple by which two of the drums or units of the thermostat are coupled together.

Like reference characters designate the same parts wherever they occur in all the figures.

The trap comprises a hollow body, or shell or casing 1, having a branch 2 for connection with the steam pipe from which condensation is to be relieved, and an outlet 3 at the bottom, in which is inserted a removable valve seat plug 4. This body has a large opening in its upper end for insertion of the thermostat and is fitted with a removable cap 5.

The thermostat consists of a drum 6, or a series of such drums connected together; a number of them in axial alinement being preferred to a single one in order to effect a desired movement of the valve without making the thermostat and trap body inconveniently large in diameter. I have here shown three such drums, but it is to be understood that any number may be used. Each drum consists of two diaphragms 7 and 8 connected together at the circumference. The uppermost diaphragm of the series is connected by a nipple 9 to the wall or structure at the upper end of a cage or frame 10 by which the thermostat is supported in the trap body and protected when removed therefrom; and the lowermost diaphragm of the series is secured to and supports a valve 11 arranged to close and open the passageway through the valve seat plug 4. The lower end of the cage or holder 10 rests on an internal shoulder 12 within the trap body. A spider 13 having a number of offset stiff spring arms is secured externally to the upper end of the holder 10 by a nut screwed on the protruding threaded end of nipple 9; and its arms press against the cap to take up looseness between the cage or holder and the casing, and prevent rattling.

In a thermostat consisting of a single drum, the diaphragms forming the top and bottom of this drum are the ones to which the nipple 9 and valve 11 are connected; but when there are two or more drums, intermediate nipples 14, secured to the bottom diaphragm of each upper drum, and 15, secured to the upper diaphragm of each lower drum, are provided, and such nipples are screwed together. The nipples 9, 14 and 15, and valve 11, are all secured to their respective diaphragms in the same manner, which is novel with this invention, and all of them, including the valve, may be considered as nipples within the meaning and scope of the claims under which I seek protection for my novel joint between a diaphragm and a nipple.

Each of such joints is made thus:—The diaphragm is formed with a hole, preferably at the center, and (preferably) with a flange or lip 16 entirely surrounding the rim of the hole and projecting at the side which becomes the inner side of the diphragm when the latter is joined with its companion to make a drum. The nipple is of larger diameter than the hole and is formed with a central tubular neck 17 of a diameter enough smaller than the hole to pass through the latter and fit snugly within the flange 16. A shoulder 18 on the nipple abuts against the outer face of the diaphragm, and the tubular neck 17 is longer than the flange 16, so that it protrudes beyond the latter when the parts are so assembled. A washer 19 of brazing material or equivalent metal or alloy having a high melting point is placed over the flange 16 against the inner surface of the diaphragm, and a rigid securing ring 20 is then placed over the flange 16 against this washer. The protruding end of the tubular neck 17 is next flanged over and pressed hard against the outer face of the ring 20, forming an overlapping lip 21, and the parts so assembled are heated sufficiently to melt the washer 19. Heat for this purpose may be generated by electric current passed through electrodes engaged with the nipple and ring, or may be applied in any other suitable way. The melted brazing material flows into the cracks between the ring 20 and the flange 16 and lip 21, and adheres to the surfaces with which it comes into contact. The same heating effect also serves to melt the washer or washers placed between the complemental nipples, as later described, when fusible metal washers are there used.

For peripherally joining the two diaphragms which form each drum, said diaphragms are bent and offset near the outer circumference to form a cylindrical wall 22, an outstanding web 23, and a backwardly turned flange 24. The wall 22 is turned in the same direction as the lip 16 of the diaphragm, while the flange 24 is turned in the opposite direction. These parts and the bends between them may be formed by known methods of sheet metal working, as by spinning or drawing; the sheet metal of which the diaphragms are made having sufficient ductility for such treatment. The two diaphragms of the drum are assembled together outside of a rigid supporting ring 25, so that their cylindrical walls 22 embrace the ring, each enveloping nearly half the length of the ring, with a gasket 26 between their web portions 23. The ring 25 is a rigid cylindrical section, conveniently cut from a tube, with proper dimensions as to external diameter and length to fit closely within the assembled diaphragms, and to hold their web portions 23 apart slightly more than the thickness of the gasket 26. It is preferably counterbored or chamfered internally at both ends to limit the area of its end bearings on the diaphragms, and locate its lines of contact therewith close to the outer circumferences and cylindrical walls of the diaphragms; thus locating the flexing lines of the diaphragms at their outer circumferences, exposing the maximum area of the diaphragms to fluid pressures, and securing uniformity of action of the diaphragms under repeated like conditions. Soft solder may be placed at 27 in the joints between the webs 23 and the gasket as a temporary fastener to hold the parts together while the further steps of closing and sealing the joint are being performed.

Clamp rings 28 and 29 are then passed over the cylindrical walls 22 of the two diaphragms and against the webs 23 thereof. These rings have external recesses to admit the flanges 24, and are preferably beveled on a small angle, both on their outer circumferences and their outer end faces. The circumferential beveling is of such character and amount as to cause the edges of the diaphragm flanges to project slightly beyond the adjacent surfaces of the rings, while their end bevels are such as to make their thickness at the inner circumference somewhat less than the thickness at the outer circumference; substantially as shown in Fig. 2 of the drawings. Finally a binder ring 30 having a flange or lip 31 at one end is passed over the clamp rings 28 and 29. Said binder ring is preferably made of a section of tubing having a large enough external diameter than the original thickness of wall of which is equal to the entire length of flange 31. It is cut out integrally throughout less than its whole length to make a bore large enough to receive the clamp rings and diaphragm flanges, and leave intact at one end the metal forming the flange 31. The end of the binder ring opposite to the flange 31 is made originally cylindrical in alinement with the main body of the ring, and the entire length of this ring is substantially or nearly equal to the length of the two clamp rings 28 and 29, and the thickness of the two webs 23 and gasket 26, combined, plus the radial thickness of the clamp rings. After being thus assembled, the end part of the binder ring which then projects beyond clamp ring 28 to a distance about equal to the thickness of the clamp ring is turned inward, by spinning or otherwise, and is pressed down on the outer face of the latter ring, with great pressure, by one of the jaws of a press, the other jaw of which bears against the flange 31; or it may be turned inward all the way by spinning alone. Thus a flange 32 is formed on the binder ring opposite to the flange 31. The pressure and reaction thus applied to the flanges 32 and 31 causes them to be laid and pressed forcibly against the beveled end faces of the clamp rings 28 and 29, which are thereby moved toward one another and caused to draw the webs 23 of the diaphragms together and squeeze them close against the gasket 26, at the same time pulling the angles 33 of the diaphragms closely around and against the ends of the supporting ring 25. Thereby a tight mechanical joint having close sealing contact on at least four surfaces as to each diaphragm is completed; namely, that between the diaphragm and the supporting ring, between the web 23 and gasket 26, between the flange 24 and the binder ring, and between the outer face of either clamp ring and the adjacent enveloping flange of the binder ring. Such contact surfaces, being arranged in series, supplement one another in preventing escape of the fluid contained in the thermostat.

The gasket 26 is preferably of a metal which is softer than that out of which the diaphragms are made, in order that it may be deformed under the pressure applied as described, and thereby caused to flow into close contact with the diaphragm webs in at least a continuous line throughout the entire circumference of the drum. I may use lead or a similarly soft alloy for such gaskets, but for convenience in manufacture, inasmuch as a lead ring of so large a diameter in proportion to its width and thickness is limp and easily bent out of shape, I prefer to use a stiffer material, such as annealed copper or an alloy having similar stiffness.

The nipples 14 and 15 between each two drums constitute a pair, one of the members of which has an externally threaded extension 34, and the other has a threaded enlargement of its bore to mate with the threads of such extension. Either member of the pair may have such threaded extension, and Fig. 1 shows the extension in one instance on the nipple 14, and in the other instance on the nipple 15. The internally threaded member, in each instance, has on its end a peripheral rib 35 which surrounds the adjacent end portion of the other member, the latter being reduced in diameter sufficiently, and to a sufficient length, to accommodate such rib. Thereby one of the members is provided with an internal shoulder 36 and the other with an external shoulder 37, each opposite to a complemental surface of the other member. In connecting two drums of the thermostat together, their complemental nipples are screwed together after a soft metal gasket 38 has been placed between the shoulder 36 and the contiguous surface of the other nipple. The metal of which this gasket is made is sufficiently ductile to be squeezed into close contact with the contiguous surfaces by the pressure applied in screwing up the parts; and it has some resilience also, enough to keep the joint tight with such slight relative movements of the contiguous surfaces of the nipples as occur as the result of temperature changes. Lead or annealed copper is a suitable material for such gasket and so are alloys having characteristics similar to those of the metals named. However, I may use here a gasket of similar characteristics to the washer 19, and fuse it by heat after the nipples have been screwed together. The gasket 36 and also the washers 19 of the complemental nipples may all be fused at the same time. The space between the shoulder 37 and the adjacent surface of the other nipple is preferably filled with solder 39, which may be flowed into the crack after the nipples have been screwed together, or may be provided as a gasket placed between these parts and subsequently fused.

The diaphragms of this thermostat are preferably made of a patented alloy which withstands high temperature steam without softening, and repeated bending strains without cracking, and is non-corrodible. The nipples and rings are preferably made of bronze, the qualities of which as to resisting the effects of high temperature steam and water are well known. In other words, the materials of which the thermostat is made do not constitute the present invention. My problem has been, given structural materials suitable to withstand indefinitely the deteriorating effects of high temperature steam and water, to devise joints between the structural parts of the thermostat which will be leakage tight under the necessary pressure differential between the interior and exterior of the thermostat, and will not be destroyed or softened by high temperatures. It is considered good practice in thermostats of the class for which this invention is particularly designed, to operate with an excess of internal pressure amounting to about 25 or 30 pounds per square inch at all temperatures within the operating range. To remain firm and leakage tight when exposed to steam at a pressure of 100 pounds per square inch, the joints must be immune from such softening or weakening as would endanger their integrity at a temperature at least as high as 340° F.; while to provide a desired factor of safety, they should remain strong and tight up to temperatures in the neighborhood of 400° F. This problem I have solved by the construction hereinbefore described and with the use of a brazing or uniting material at the places hereinbefore described, consisting of a metal alloy which melts at about 450° F. and does not soften materially until heated almost to that degree.

The invention includes, further, means or provisions for protecting the thermostat from the destructive effects of water hammer. A slug of water, surging into the trap under high pressure and more rapidly than it can escape through the valve seat orifice, will exert external pressure on the thermostat greatly exceeding the internal pressure, the volatile fluid within the thermostat being then at so low a temperature as to exert only a relatively small pressure. The high external pressure so caused is liable to collapse the thermostat and strain the diaphragm thereof beyond the elastic limit, producing a permanent set which the moderate excess of internal pressure developed when the thermostat is heated by steam is unable to overcome. Thermostatic traps of the fluid expansion type have frequently been made leaky from this cause.

I have avoided this difficulty by reducing the water inlet passage to the trap to an area substantially equal to that of the discharge outlet. The type of trap here illustrated is formed with a chamber or well 40 beneath, and opening from the under side of, the inlet branch 2, in which there is a strainer 41, and from which a passage 42 leads to the chamber containing the thermostat. Water flowing to the trap naturally falls into the well, from which its flow to the thermostat chamber is restricted by the small diameter of passage 42, to a rate approximately the same as the rate at which it can flow through the valve seat orifice past the open valve 11.

A partition 43 is located between the entrance chamber 2 and the thermostat chamber, which prevents flow of water directly into the thermostat chamber, and in which there is only a small orifice 44, located above the bottom of passage 42. This orifice is provided to permit a restricted flow of steam into the thermostat chamber before all the water has drained from the trap and steam has been permitted to pass to the thermostat through the passage 42. Thus a preliminary warming of the thermostat is caused, which enables the valve 11 to be closed immediately after the steam flows through the passage 42, avoiding a more or less extended period of steam leakage before steam following air or water through the passage 42 has had time to heat the thermostat enough to close the valve.

What I claim and desire to secure by Letters Patent is:

1. In a thermostat of the character described, complemental diaphragms peripherally connected together to form a drum, said diaphragms having peripheral walls offset toward one another, and outwardly extending webs in parallel with one another, combined with clamp rings flanking and bearing on the outer sides of said webs and a binder ring surrounding said clamp rings and having flanges in pressure exerting engagement against the outer end surfaces of the clamp rings.

2. In a thermostat of the character described, complemental diaphragms peripherally connected together to form a drum, said dipahragms having peripheral walls offset toward one another, and outwardly extending webs from the edges of said walls in parallel with one another, combined with clamp rings flanking said webs and pressing against the outer sides thereof, a gasket between the webs, and a binder ring surrounding said clamp rings and having flanges in pressure exerting engagement against the outer end surfaces of the clamp rings.

3. In a thermostat of the character described, complemental diaphragms peripherally connected together to form a drum, said diaphragms having peripheral walls offset toward one another, outwardly extending webs in parallel with one another, and flanges at the outer edges of said webs extending away from one another, combined with clamp rings flanking and bearing on the outer sides of said webs between the walls and flanges of the respective diaphragms, and a binder ring surrounding said clamp rings and flanges and having flanges embracing the clamp rings in pressure exerting contact with the outer ends thereof.

4. A thermostatic trap having a thermostat chamber and a valve governed outlet therefrom, and comprising a valve-operating, flexible-walled fluid-containing thermostat in said chamber, said trap having also an inlet chamber and a passageway therefrom to the thermostat chamber having a flow capacity substantially equal to that of the said outlet when the controlling valve thereof is fully opened.

5. A thermostatic trap having a thermostat chamber and a valve governed outlet therefrom, a valve-operating flexible-walled fluid-containing thermostat in said chamber, said trap having also an inlet chamber and a passageway therefrom to the thermostat chamber having a flow capacity substantially equal to that of the said outlet when the controlling valve thereof is fully opened, said inlet chamber having also a restricted orifice leading to the diaphragm chamber out of the path through which water normally flows to said outlet, whereby to admit steam for preliminary warming of the thermostat before complete discharge of water from the trap.

6. An expansible thermostatic drum comprising diaphragms having circumferential end walls turned toward one another, and outwardly extending parallel webs, combined with a supporting ring between the diaphragms within and adjacent to said walls, clamp rings surrounding said walls on opposite sides of the said webs and in pressure exerting contact with the outer faces thereof, and a binder ring surrounding said clamp rings and having flanges embracing the outer end faces of the clamp rings in pressure exerting contact against the outer ends thereof.

In testimony whereof I have affixed my signature.

WILLIAM K. SIMPSON.